United States Patent [19]
Lindquist et al.

[11] Patent Number: 5,869,562
[45] Date of Patent: Feb. 9, 1999

[54] HOT MELT PRESSURE SENSITIVE ADHESIVE DESIGNED FOR USE ON HIGH DENSITY SPUN POLYOLEFIN FILM

[75] Inventors: Jeffrey S. Lindquist, Cottage Grove; Janelle C. Cameron, Mendota Heights; Eugene R. Simmons, Vadnais Heights, all of Minn.

[73] Assignee: H. B. Fuller Licensing & Financing, Inc., St. Paul, Minn.

[21] Appl. No.: 829,712

[22] Filed: Mar. 28, 1997

[51] Int. Cl.⁶ .............. C08L 53/02; C08L 57/02; C08L 93/04
[52] U.S. Cl. .......... 524/505; 524/271; 524/274; 524/499; 525/88; 525/98; 525/99
[58] Field of Search .............. 524/271, 274, 524/499, 505; 525/98, 99, 88

[56] References Cited

U.S. PATENT DOCUMENTS

| | | | |
|---|---|---|---|
| 3,686,107 | 8/1972 | Russell | 524/274 |
| 3,850,858 | 11/1974 | Park | 525/98 |
| 3,917,551 | 11/1975 | Jurrens et al. | 525/99 |
| 3,932,328 | 1/1976 | Korpman | 524/271 |
| 3,993,613 | 11/1976 | Doss et al. | 524/274 |
| 4,046,838 | 9/1977 | Feeney | 525/97 |
| 4,060,503 | 11/1977 | Feeney et al. | 524/505 |
| 4,141,876 | 2/1979 | Hansen | 524/505 |
| 4,141,878 | 2/1979 | Coran et al. | 524/528 |
| 4,411,954 | 10/1983 | Butch, III et al. | 428/343 |
| 4,781,296 | 11/1988 | Morris et al. | 206/610 |
| 5,286,781 | 2/1994 | Gotoh et al. | 524/271 |
| 5,292,806 | 3/1994 | Diehl et al. | 525/98 |
| 5,292,819 | 3/1994 | Diehl et al. | 525/314 |
| 5,372,870 | 12/1994 | Diehl et al. | 525/98 |
| 5,399,627 | 3/1995 | Diehl et al. | 525/98 |
| 5,468,237 | 11/1995 | Miller et al. | 524/505 |
| 5,550,196 | 8/1996 | Spence et al. | 525/98 |
| 5,576,395 | 11/1996 | Spence et al. | 525/98 |
| 5,719,226 | 2/1998 | Kepley | 524/505 |

FOREIGN PATENT DOCUMENTS

| | | | |
|---|---|---|---|
| 645530 | of 0000 | Australia . | |
| 0 318 217 | of 0000 | European Pat. Off. . | |
| 0 700 978 A1 | of 0000 | European Pat. Off. . | |
| 0 757 066 A1 | of 0000 | European Pat. Off. . | |
| 0 798 358 A1 | of 0000 | European Pat. Off. . | |
| 0318217 | 5/1989 | European Pat. Off. | 524/499 |
| 2452584 | 5/1976 | Germany | 524/271 |
| WO 98/00471 | of 0000 | WIPO . | |
| WO 98/02498 | of 0000 | WIPO . | |

OTHER PUBLICATIONS

Derwent Abstract on JP 05105859.
Derwent Abstract on JP 5105858.
Derwent Abstract on JP 5302071.

*Primary Examiner*—Peter A. Szekely
*Attorney, Agent, or Firm*—Nancy N. Quan; Lisa L. Ryan

[57] ABSTRACT

This invention relates to an envelope coated with a hot melt pressure sensitive adhesive composition preferably comprising a) from about 10% to about 40% by weight in the adhesive of at least one block copolymer selected from the group consisting of styrene-isoprene-styrene block copolymers, styrene-butadiene-styrene block copolymers and mixtures thereof wherein the block copolymers comprise from about 15% to about 35% styrene by weight in the copolymer and diblock contents from about 0% to about 90% by weight in the copolymer; and b) from about 60% to about 90% by weight in the adhesive of a modifier selected from the group consisting of solid tackifying resins, liquid tackifying resins, liquid elastomers and mixtures thereof. The invention further relates to an improved oil-free pressure sensitive adhesive that is low in viscosity and provides a destructive bond and resists deformation of high density spun polyolefin materials.

9 Claims, No Drawings

HOT MELT PRESSURE SENSITIVE ADHESIVE DESIGNED FOR USE ON HIGH DENSITY SPUN POLYOLEFIN FILM

FIELD OF THE INVENTION

This invention relates to a hot melt pressure sensitive adhesive comprising at least one block copolymer of the general formula A-B-A triblocks, A-B diblocks, A-B-A-B-A-B multiblocks and radial blocks including styrene-butadiene-styrene or styrene-isoprene-styrene. The hot melt pressure sensitive adhesive is oil-free and plasticizer-free and forms destructive bonds when applied to high density spun polyolefin material, and resists deformation of the material. This hot melt pressure sensitive adhesive is particularly useful for envelope closures.

BACKGROUND OF THE INVENTION

Hot melt pressure sensitive adhesives are very popular for use in the envelope and label areas primarily because the inherent tackiness at room temperature allows them to be adhered to substrates even after they have cooled from their molten state. Labels and envelopes may be coated with hot melt pressure sensitive adhesives and laminated with release liner allowing end users to adhere or seal them at a later time.

This characteristic is very important for shipping envelopes. The end user may fill the envelope with documents and articles for shipping desiring that the envelope remain sealed during tossing, careless handling and jostling in a truck or airplane.

High density spun polyolefin (especially polyethylene) material is commonly used in the envelope industry for such things as express shipping. This material is a fibrous non-woven thermoplastic material which is formed from polyolefin fibers and is sufficiently bonded to form a very tough web material which is highly resistant to tearing. This material may be found under the trade name of Tyvek™ which is manufactured by E.I. Du Pont de Nemours Co. in Wilmington, Del. U.S. Pat. No. 4,781,296 to Morris et al. issued Nov. 1, 1988 describes an envelope made from this type of material.

While these polyolefin materials are desired because they are tough and tear resistant, they are also very difficult to adhere. Manufacturers and end users of envelopes desire that the adhesive provide full fiber tearing, or destructive bonds, to this material. This not only insures that the contents will remain in the envelopes until they reach the final destination, but it may also be an indication of whether the envelope has been opened prior to reaching its final destination. Full fiber tearing bonds on these types of materials have been difficult for adhesive manufacturers to achieve.

Another major concern of envelope and label manufacturers and users of hot melt adhesives is staining of paper, and staining and deformation of these polyolefin materials and composites or laminates thereof caused by oils and plasticizers, which are generally components used in hot melt pressure sensitive adhesives.

Oils and plasticizers are low molecular weight species having very low glass transition temperatures and are used to facilitate processing of high molecular weight polymers by reducing polymer viscosity and to increase the flexibility of the finished adhesive by solvating the polymer molecule. These low molecular weight species, however, have a tendency to migrate from the adhesive resulting in the staining and deformation noted earlier. This migration can further cause a deterioration of the adhesive bond which may result in failure of the envelope seal which in turn may result in loss of the contents, or may result in loss of labels from the substrates to which they are adhered.

Deformation is a common problem with high density spun polyolefin substrates which is caused by the oils or plasticizers in the adhesives being absorbed by the material resulting in swelling and waviness of the envelope flap and ultimate bond failure of the adhesive seal. When these low molecular weight components are absorbed by the polyolefin material, it also tends to separate from the release liner which is there to protect the exposed adhesive from dust and dirt, and to prevent premature adherence of the adhesive to other envelopes or labels during shipping and storage.

These polyolefin materials also require low application temperatures of less than about 150° C., preferably from about 135° C. to about 150° C., to prevent deformation caused by high temperatures which in turn requires adhesives with relatively low viscosities.

U.S. Pat. No. 3,932,328 to Korpman issued Jan. 13, 1976 teaches an oil-free adhesive composition useful for diaper tapes. These compositions, however, are high in viscosity, having viscosities of about 10,000 cPs to about 75,000 cPs at 175° C. Korpman teaches narrow compositions utilizing only Kraton™ D-1107 which is a 15% styrene and 18% diblock linear SIS, and does not contemplate blending other block copolymers or liquid elastomers with the Kraton™ D-1107.

There remains a need in the industry to have a low viscosity hot melt pressure sensitive adhesive for sealing such envelopes that would eliminate these problems which occur during aging of the adhesive while shipping and in storage. Surprisingly, the current inventors have found a low viscosity oil-free, plasticizer-free hot melt pressure sensitive adhesive that not only forms a destructive bond to high density spun polyolefin film, but resists deformation of the material as well.

SUMMARY OF THE INVENTION

This invention relates to a hot melt pressure sensitive adhesive composition comprising a) from about 10% to about 40% by weight in the adhesive of at least one block copolymer having the general formula A-B-A triblocks, A-B diblocks, A-B-A-B-A-B multiblocks and radial blocks including styrene-isoprene-styrene block copolymers, styrene-butadiene-styrene block copolymers and mixtures thereof, wherein the block copolymers comprise from about 15% to about 35% styrene by weight in the copolymer and diblock contents from about 0% to about 90% by weight in the copolymer; and b) from about 60% to about 90% by weight in the adhesive of a modifier including solid tackifying resins, liquid tackifying resins, liquid elastomers and mixtures thereof.

The invention further relates to an envelope having a flap and made of high density spun polyethylene wherein the flap is coated with a hot melt pressure sensitive adhesive for sealing the envelope and the hot melt adhesive comprises a) from about 10% to about 40% by weight in the adhesive of at least one block copolymer including styrene-isoprene-styrene block copolymers, styrene-butadiene-styrene block copolymers and mixtures thereof wherein the block copolymers comprise from about 15% to about 35% styrene by weight in the block copolymer and a diblock content from about 0% to about 90% by weight in the copolymer; and b) from about 60% to about 90% by weight in the adhesive of a modifier including solid tackifying resins, liquid tackifying resins, liquid elastomers and mixtures thereof.

The invention further relates to a method of providing destructive bonds to and resisting deformation of high density spun polyolefin materials comprising applying a coating of a hot melt pressure sensitive adhesive composition to the materials at an application temperature of less than about 150° C., and preferably from about 135° C. to about 150° C.

The unique combination of ingredients imparts high cohesive strength, very aggressive tack and low enough viscosity for use on existing application equipment, surprisingly without the use of very low molecular weight oils or plasticizers. Low viscosities are achieved without the use of oils or plasticizers removing the adhesives components that cause swelling and deformation of the high density spun polyolefin materials.

These adhesives can be used for envelopes and labels produced from the high density spun polyolefin material and also for applying substrates made from other materials to the high density spun polyolefin, as well as for other applications where this material may be used.

DETAILED DESCRIPTIONS OF THE PREFERRED EMBODIMENTS

The block copolymers useful in the present invention include styrene-isoprene-styrene (SIS) and styrene-butadiene-styrene (SBS) block copolymers having a styrene content from about 15% to about 35% by weight in the copolymer and a diblock content from about 0% to about 90% by weight in the copolymer. The glass transition temperatures (Tgs) of the polyisoprene midblocks are in the range of about –50° C. to about –60° C. while the Tgs of the polybutadiene midblocks are in the –90° C. range. These block copolymers may have the general formula A-B-A triblocks, A-B diblocks, A-B-A-B-A-B multiblocks and radial blocks, wherein the A block is styrene and the B block is isoprene or butadiene. Examples of useful block copolymers include the Kraton™ D series from Shell Chemical Co. in Houston, Tex. including Kraton™ D-1102, a 28% styrene and 15% diblock linear SBS; D-1107, a 15% styrene and 18% diblock linear SIS; D-1111, a 22% styrene and 15% diblock linear SIS; D-1112, a 15% styrene and 40% diblock linear SIS; D-1113, a 16% styrene and 55% diblock linear SIS; D-1117, a 17% styrene and 35% diblock linear SIS; Vector™ 8508, a 28% styrene and 0% diblock linear SBS; Vector™ 2518, a 30% styrene and 0% diblock linear SBS; Vector™ 4111, an 18% styrene and 0% diblock linear SIS; Vector™ 4113, a 15% styrene and 18% diblock linear SIS; Vector™ 4114, a 15% styrene and 42% diblock linear SIS; and Vector™ 4211, a 28% styrene and 0% diblock linear SIS all available from Dexco Polymers in Houston, Tex. These polymers are useful from about 10% to about 40% by weight in the adhesive and preferably from about 15% to about 35% by weight in the adhesive and most preferably from about 20% to about 30% by weight in the adhesive.

The modifiers useful herein include solid tackifying resins, liquid tackifying resins and liquid elastomers. The solid tackifiers useful herein include aromatic, aliphatic and cycloaliphatic hydrocarbons and modified hydrocarbons and hydrogenated derivatives, terpenes and modified terpenes and hydrogenated derivatives and rosins and modified rosins and hydrogenated derivatives. These tackifying resins have a Ring and Ball softening point of between about 70° C. and about 150° C. These tackifying resins are generally commercially available with differing levels of hydrogenation. Useful resins include Eastotac™ H-100, H-115 and H-130, partially hydrogenated cycloaliphatic petroleum hydrocarbon resins with softening points of 100° C., 115° C. and 130° C., respectively. These resins are available in the E grade, R grade, L grade and W grade indicating increasing levels of hydrogenation and therefore lighter respectively. They are available from Eastman Chemical Co. in Kingsport, Tenn. Other available resins include Escorez™ 5300 and Escorez™ 5400, partially hydrogenated cycloaliphatic petroleum hydrocarbon resins, and Escorez™ 5600, a partially hydrogenated aromatic modified petroleum hydrocarbon resin all available from Exxon Chemical Company in Houston, Tex.; Wingtack™ Extra which is an aliphatic, aromatic petroleum hydrocarbon resin, Wingtack™ 86, an aromatic modified synthetic polyterpene hydrocarbon resin and Wingtack 95, a synthetic polyterpene all available from Goodyear Tire and Rubber Co. in Akron, Ohio; Hercolite™ 2100 which is a partially hydrogenated cycloaliphatic petroleum hydrocarbon resin available from Hercules Inc. in Wilmington, Del. and Zonatac™ 105 Lite which is a styrenated terpene hydrocarbon resin, made from d-limonene and available from Arizona Chemical in Panama City, Fla. Useful modified rosins include Sylvatac™ 1103 and Zonester™ 100 available from Arizona Chemical and Permalyn 305 available from Hercules which are all pentaerythritol rosin esters. Sylvatac™ 1085, an 85° C. softening point glycerol rosin ester of tall oil is another example of a useful rosin based tackifier. There are numerous types of rosins and modified rosins with differing levels of hydrogenation including gum rosins, wood rosins, tall-oil rosins, distilled rosins, dimerized rosins and polymerized rosins. Some specific modified rosins include glycerol and pentaerythritol esters of wood rosins and tall-oil rosins. Coumarone Indene resins available from Neville Chemical Co. in Pittsburgh, Pa. are also useful to the adhesives of the present invention. Some examples include Cumar™ R-1, R-3 and R-5 all 126° C. softening point coumarone indene resin and Cumar LX™-509, a 155° C. softening point coumarone indene resin. Examples of useful straight styrene resin are Kristalex™ 3070 (70° C. softening point), 3085 (85° C. softening point) and 3100 (100° softening point) available from Hercules in Wilmington, Del.

The liquid tackifying resins useful herein include aliphatic and cycloaliphatic hydrocarbons and modified hydrocarbons and hydrogenated derivatives and terpenes and hydrogenated derivatives. These liquid tackifying resins have softening points of less than about 70° C., preferably less than about 50° C. and most preferably less than about 30° C. The present inventors have found that those liquid tackifying resins which do not associate with the styrene end-blocks of the block copolymers, and enhance the tack by associating with the isoprene or butadiene midblocks of the hot melt are most useful to the present invention.

Liquid tackifying resins may be distinguished from oils and plasticizers in that liquid tackifiers have glass transition temperatures (Tg), generally below –20° C., whereas oils and liquid plasticizers do not have a glass transition temperature in that they remain in the liquid state at temperatures well below –20°, and even at temperatures below about –90° C.

The primary purpose of the tackifying resin is to increase tack in the pressure sensitive adhesive. The best way to achieve this result is to use midblock associating and styrene endblock non-associating resins. This also improves the specific adhesion of the finished product. The fact that the liquid tackifying resins have higher Tg's than the block copolymers results in a reduction of cold temperature flexibility and cold temperature tack.

Examples of useful liquid tackifying resins include but are not limited to Escorez™ 2520, a liquid petroleum based hydrocarbon resin with a softening point of 20° C. and Wingtack™ 10, a liquid hydrocarbon resin with a softening point of 10° C. available from Goodyear Chemical Co.

Useful liquid elastomers include polybutene, polyisobutylene and polyisoprene. Some examples are Parapol™ 700, 950 and 1300, liquid butene homopolymers available from Exxon Chemical Co. in Houston, Tex. having weight average molecular weights of about 700, 950 and 1400 respectively; Indopol™ H-50, H-100 and H-300, liquid butene homopolymers available from Amoco Corp. in Chicago, Ill. which are counterparts to the Parapol™ series; and Isolene™ D-40, a liquid polyisoprene with a molecular weight of about 40,000, available from Hardman Rubbers, a division of Harcros Chemical Co. in Belleville, N.J. As the molecular weight of a given liquid elastomer is increased the resultant adhesives of the present invention exhibit increasingly superior performance on high density spun polyethylene film in terms of decreased swelling and distortion of the material. While the adhesives having liquid elastomers in general exhibited superior performance over adhesives having oils and plasticizers, and hence are within the scope of the present invention, increasing the molecular weight of the liquid elastomers showed even further improved performance. Liquid elastomers, in contrast to oils and plasticizers which decrease adhesive viscosity and improve flexibility, are used primarily to improve tack and cold temperature adhesion. Liquid elastomers are also typically more compatible with the midblocks of the block copolymers and can be used in higher amounts relative to the block copolymer amount, therefore lowering the viscosity of the resultant pressure sensitive adhesives significantly without the increased risk of migration of the low molecular weight species which leads to staining, bleed-through, decreased adhesion and deformation of the substrates. It is further desired that the liquid elastomers, as in the case of the liquid tackifying resins, do not soften or "plasticize" the styrene end-blocks of the block copolymers.

These modifiers are useful in amounts from about 60% to about 90% by weight in the adhesive and preferably from about 60% to about 80% and may be used in any combination. For example, when at least 10% liquid elastomer is used, then at least 50% by weight in the adhesive of a blend of solid tackifier and liquid tackifier will be used. The liquid tackifiers are useful in amounts from about 0% to about 50% by weight in the adhesive, preferably from about 10% to about 40% by weight in the adhesive and most preferably from about 20% to about 40% by weight in the adhesive. The liquid elastomers are useful in amounts from about 0% to about 50% by weight in the adhesive, preferably from about 10% to about 40% by weight in the by adhesive, and most preferably from about 15% to about 35% by weight in the adhesive. The solid tackifiers are useful in amounts from about 20% to about 90% by weight in the adhesive, preferably from about 30% to about 70% by weight in the adhesive and most preferably from about 40% to about 60% by weight in the adhesive.

Other polymers can be added to the adhesives of the present invention. These polymers include but are not limited to rubbery block copolymers, homopolymers, copolymers and terpolymers of ethylene and homopolymers, copolymers and terpolymers of propylene. Examples include Stereon 840A and 845A, A-B-A-B-A-B multiblock copolymers of styrene and butadiene having styrene contents of about 45% by weight in the copolymer; other block copolymers under the trade name of Kraton™ G and Kraton™ D from Shell Chemical Co.; other block copolymers having styrene endblocks and butadiene or isoprene midblocks sold under the trade name of Vector™ from Dexco Chemical Co.; the Rextac™ series of atactic polypropylene polymers from Rexene Products Co. in Dallas, Tex.; the Eastoflex™ series of polypropylene polymers from Eastman Chemical Co. in Kingsport, Tenn.; the Epolene™ series of polyethylene polymers from Eastman Chemical Co.; the Elvax™ series of ethylene vinyl acetate copolymers from DuPont in Wilmington, Del.; the Optema™ series of ethylene methyl acrylate copolymers from Exxon Chemical Co in Houston, Tex.; the Lotryl™ series of ethylene n-butyl acrylate copolymers from Elf Atochem North America in Philadelphia, Pa. and the Escorene™ series of ethylene n-butyl acrylate copolymers from Exxon Chemical Co.

Other useful thermoplastic polymers that may be added to the adhesives of the present invention are homogeneous linear or substantially linear interpolymers of ethylene with at least one $C_3$ to $C_{20}$ alphaolefin, further characterized by each said interpolymer having a polydispersity less than about 2.5 including such polymers as Exact™ 5008, an ethylene-butene copolymer, Exxpol™ SLP-0394, an ethylene-propylene copolymer, Exact™ 3031, an ethylene-hexene copolymer, all available from Exxon Chemical Co. These types of polymers are also available from Dow Chemical Co. in Midland, Mich. under the trade name of Insite™.

These polymers are useful in amounts up to about 10% by weight of the adhesive as long as they do not adversely affect the desired characteristics of the hot melt pressure sensitive adhesive.

A stabilizer or antioxidant is also preferably used in these hot melt adhesives. These compounds are added to protect the adhesive from degradation caused by heat, light, or residual catalyst present in some raw materials such as tackifying resins. Such antioxidants are commercially available from Ciba-Geigy in Tarrytown, N.Y. and include Irganox™ 1010 and Irganox™ 1076 which are hindered phenols. These are primary antioxidants which act as radical scavengers and may be used alone or in combination with other antioxidants such as phosphite antioxidants like Irgafos™ 168, also available from Ciba-Geigy. Phosphite antioxidants are considered secondary antioxidants and are not generally used alone. These are primarily used as peroxide decomposers. Other available antioxidants are Cyanox™ LTDP, a thiocater, available from Cytec Industries in Stamford, Conn., and Ethanox™ 330, a hindered phenol, available from Albemarle Corp. in Baton Rouge, La. Many such antioxidants are available either to be used alone or in combination with other such antioxidants. These compounds are added to the hot melts in small amounts and have no effect on the other physical properties. Other compounds that could be added that also do not affect physical properties are pigments which add color, or fluorescing agents, to mention only a couple. Additives like these are known to those skilled in the art.

The resultant adhesives provide highly aggressive initial tack and high cohesive strength resulting in a destructive bond to materials such as high density spun polyethylene. Destructive bonds refer to the adhesive tearing the fibers of the substrates to which they are adhered. Full fiber tearing, or destructive bonds, are desired.

These adhesives are low enough in viscosity to be applied using existing application equipment. The resultant adhesives are characterized by viscosities of less than about 9000 cPs at 175° C., preferably less than about 5000 cPs at 175° C. and most preferably less than about 3000 cPs at 175° C.; shear adhesion failure temperatures of greater than about 35°

C., preferably greater than about 45° C. and most preferably greater than about 55° C.; and 180° peel values of greater than about 4 pounds per inch (about 700 g/cm), preferably greater than about 4.5 pounds per inch (about 800 g/cm) and most preferably greater than about 5 pounds per inch (about 900 g/cm). Permanent grade hot melt pressure sensitive adhesives are typically characterized by 180° peel values of greater than about 4 pounds per inch (about 700 g/cm) as opposed to repositionable or removable hot melt pressure sensitive adhesives, which typically have peel values below 4 pounds per inch (700 g/cm).

Surprisingly, the low viscosity and high initial tack are achieved without the use of an oil or plasticizer, therefore removing the components that tend to cause deformation of high density spun polyolefin substrates.

These characteristics make these adhesives ideal for use on envelopes and labels produced from the high density spun polyolefin (especially polyethylene) material such as Tyvek™, as well as any other types of materials used for envelopes, labels and tapes, and also in other applications where hot melt pressure sensitive adhesives with these desired properties might be used. Materials such as Tyvek™ are very popular for use in the envelope industry because they are very tough and highly tear resistant. This makes them ideal for holding up to adverse shipping conditions where packages are not always handled with care.

These hot melt pressure sensitive adhesives are typically applied by direct slot die coating onto the envelope flaps. Directly coating the material requires a low application temperature of about 150° C. or less, and preferably between about 135° C. and 150° C. to prevent distortion of the material. The low temperature of application requires a low viscosity adhesive. The only portion of the envelopes which are coated are the flaps which are then separated once the adhesive has cooled. This also requires a low viscosity adhesive so that no adhesive stringing is exhibited. Stringing of the adhesive occurs when the adhesive does not cleanly stay with the substrate and is more common with high molecular weight adhesives such as those over 10,000 cPs at 175° C. Other commonly used methods of adhesive application include roll coating and screen printing which is used for obtaining patterns, both of which require relatively low viscosity adhesives.

Samples of the adhesive are generally prepared by charging a high shear sigma blade mixer such as those manufactured by J.H. Day Co. in Cincinnati, Ohio with approximately 20% by weight of the total solid tackifying resin, the block copolymers and the antioxidants. This combination is then sheared for approximately 40 minutes to 1 hour. The remaining solid tackifying resin is then slowly added to the mixture along with the liquid tackifying resins or liquid elastomers. The resultant composition is then mixed until smooth and homogeneous. This last step takes between 15 and 30 minutes. The mixer is blanketed with nitrogen or carbon dioxide during all stages of the mixing procedure.

The following non-limiting examples further illustrate the adhesives of the invention.

EXAMPLES

Test Methods

1. Melt Viscosities

The melt viscosities of the hot melt adhesives were determined using a Brookfield Viscometer Model DVI using a number 27 spindle.

2. Shear Adhesion Failure Temperature (SAFT)

The adhesive was cast from a solvent blend as a 1 mil film using a Baker Applicator on a 2 mil gauge polyester (Mylar) film. The adhesive to solvent ratio is generally 1:1. The adhesive film was allowed to dry. Release liner was placed over the top of the film and 4 inch squares were then cut from the film. A 1 inch×4 inch area was marked and mylar film placed over the top of this. This was then cut into four samples, each having a 1 inch×1 inch bonded area. The bonds were allowed to dwell for 12 hours and then placed in a programmed oven with a 500 g weight using a shear mode. The oven was started at 25° C. and ramped at 25° C. per hour for three hours. The oven automatically recorded the temperature at which the samples failed cohesively.

3. 180° Peel Adhesion to Stainless Steel

Peel values were determined using test method #PSTC-1. A 1–2 mil adhesive film is coated onto polyester (Mylar™) film out of a solvent blend using a Baker Applicator. Samples were then cut into 1 inch×8 inch strips for determining peel values.

4. Loop Tack Testing

A 1–2 mil adhesive film was coated onto polyester (Mylar™) film out of a solvent blend using a Baker Applicator. The film was allowed to dry for a minimum of 24 hours. The film was then coated with release liner, and cut into 1 inch×5 inch strips. A test sample was then inserted into a Chemsultants International Loop Tack Tester with the adhesive side facing out (release liner removed). The Loop Tack Tester automatically recorded the tack value in $oz/in^2$.

Example 1

| Adhesive Components | % by Weight |
| --- | --- |
| Kraton ™ D-1107 (linear SIS; 22% styrene, 18% diblock) | 7.5 |
| Kraton ™ D-1113 (linear SIS; 16% styrene, 55% diblock) | 15.0 |
| Sylvatac ™ 1085 (85° C. softening point rosin ester) | 38.0 |
| Escorez ™ 2520 (20° C. softening point hydrocarbon) | 38.5 |
| Irganox ™ 1010 (hindered phenolic antioxidant) | 1.0 |

Test Results for Example 1

| Viscosity (cPs) | |
| --- | --- |
| 120° C. | 12,300 |
| 150° C. | 3,950 |
| 175° C. | 1,550 |
| Loop Tack (oz/in$^2$) | 100 |
| 180° Peel (pounds/in$^2$) | 5.8 |
| SAFT (°C.) | 42 |

Example 2

| | % by weight |
| --- | --- |
| Kraton ™ D-1111 (linear SIS; 22% styrene, 15% diblock) | 12.5 |
| Solprene ™ 1205 | 10.0 |
| Zonatac ™ 105 Lite (105° C. softening point modified terpene) | 25.5 |
| Zonester ™ 100 (94° C. softening point rosin ester) | 31.5 |
| Parapol ™ 1300 (liquid elastomer; polybutene) | 10.0 |
| Isolene ™ D-40 (liquid elastomer; isoprene) | 10.0 |
| Irganox ™ 1010 (hindered phenolic antioxidant) | 1.0 |

Test Results for Example 2

| Viscosity (cPs) | |
| --- | --- |
| 120° C. | 84,000 |
| 150° C. | 13,500 |
| 175° C. | 4,375 |
| SAFT (°C.) | 65 |

We claim:

1. A hot melt pressure sensitive adhesive, comprising:
   a) from about 10% to about 40% by weight of the adhesive of at least one block copolymer selected from the group consisting of styrene-isoprene-styrene block copolymers, styrene-butadiene-styrene block copolymers and mixtures thereof wherein said block copolymers comprise from about 15% to about 35% styrene by weight of the block copolymer and a diblock content from about 0% to about 90% by weight in the copolymer wherein the total styrene-isoprene diblock content does not exceed 55% by weight of the total polymer polymer, content a); and
   b) from about 60% to about 90% by weight of the adhesive of a modifier selected from the group consisting of solid tackifying resins having a melt point from about 70° C. to about 150° C., liquid tackifying resins, liquid elastomers and mixtures thereof;
   wherein the resultant adhesive is oil-free and provides a destructive bond to, and resists deformation of said envelope.

2. The adhesive of claim 1 wherein the viscosity at 175° C. is less than about 5000 cPs.

3. The adhesive of claim 1 wherein the 180° peel is greater than about 700 g/cm.

4. The adhesive of claim 1 wherein the liquid elastomer is selected from the group consisting of polybutene, polyisobutylene, polyisoprene and mixtures thereof.

5. The adhesive of claim 1 wherein the liquid tackifying resin is a hydrocarbon.

6. The adhesive of claim 1 wherein the at least one block copolymer is a styrene-isoprene-styrene block copolymer comprising from about 15% to about 25% styrene by weight in the copolymer.

7. The adhesive of claim 1 further comprising up to about 10% by weight in the adhesive of a thermoplastic polymer selected from the group consisting of rubbery block copolymers; homopolymers, copolymers and terpolymers of ethylene; homopolymers, copolymers and terpolymers of propylene; and mixtures thereof.

8. The adhesive of claim 1 comprising from about 20% to about 30% by weight of at least one block copolymer; from about 30% to about 60% by weight of at least one solid tackifying resin having a melt point from about 70° C. to about 150° C.; and from about 20% to about 40% by weight in the adhesive of a modifier selected from the group consisting of liquid tackifying resins, liquid elastomers and mixtures thereof.

9. The adhesive of claim 1 wherein the resultant adhesive has a SAFT of greater than about 35° C.

* * * * *